July 26, 1966  T. E. WAY  3,262,652
FISHING REEL
Filed Oct. 4, 1963
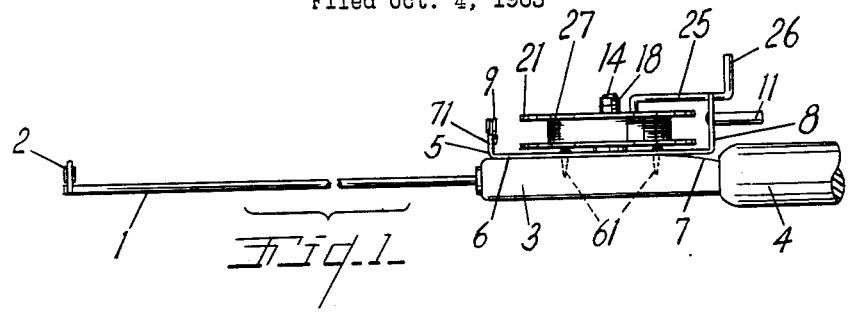
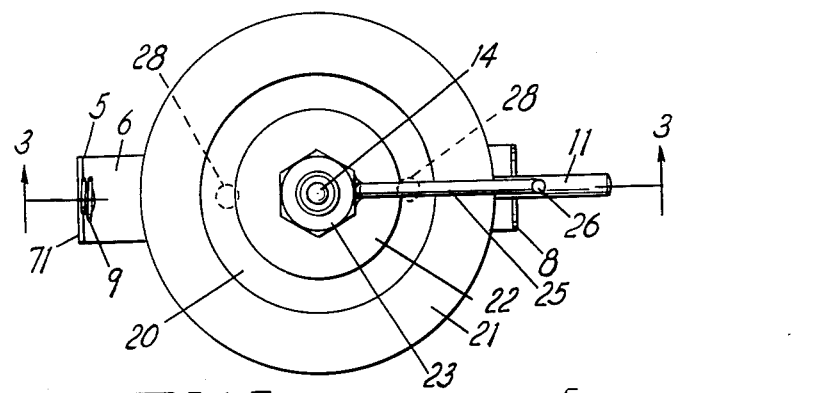
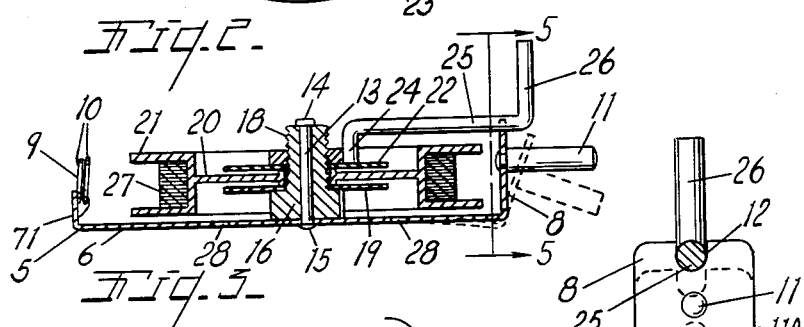
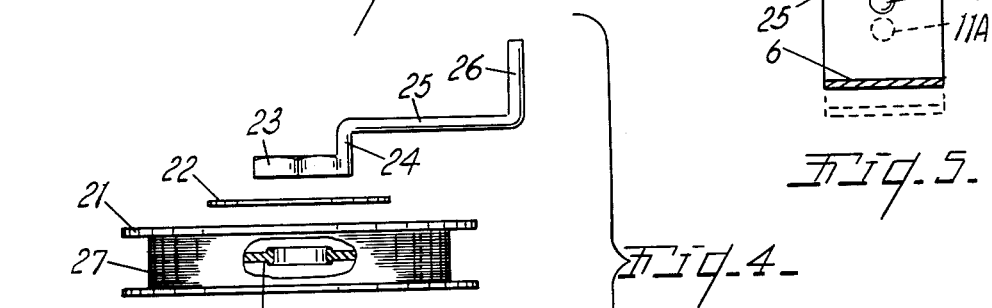
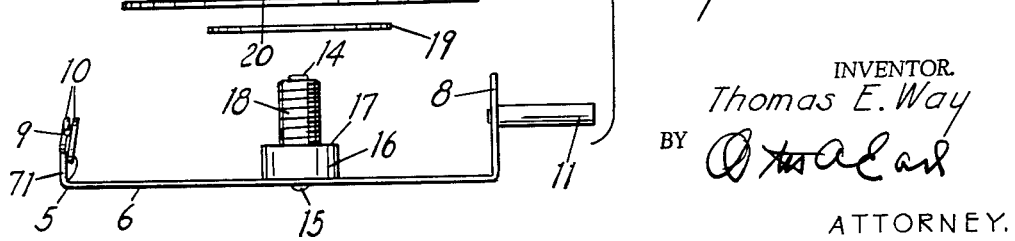
INVENTOR.
Thomas E. Way
BY
ATTORNEY.

3,262,652
FISHING REEL
Thomas E. Way, 415 Idaho, Kalamazoo, Mich.
Filed Oct. 4, 1963, Ser. No. 314,015
6 Claims. (Cl. 242—84.5)

This invention relates to improvements in fishing reel. The principal objects of this invention are:

First, to provide a novel fishing reel which will removably receive and rotatably mount a spool on which fishing line is sold so that the sales spool may be used as part of the reel.

Second, to provide an inexpensive reel attachment for a fishing pole which selectively receives a spool of line for rotation on the pole or locks the spool against rotation.

Third, to provide a flexible reel base with a portion thereof serving as a releasable brake for the reel spool.

Other objects and advantages of the invention will be apparent from a consideration of the following description and claims. The drawings, of which there is one sheet, illustrate a highly practical form of the invention.

FIG. 1 is a fragmentary side elevational view of a fishing pole with the reel of the invention attached thereto.

FIG. 2 is an enlarged top plan view of the reel.

FIG. 3 is a cross sectional view taken along the plane of the line 3—3 in FIG. 2.

FIG. 4 is an exploded side elevational view of the major parts of the reel.

FIG. 5 is a fragmentary cross sectional view taken along the plane of the line 5—5 in FIG. 3.

The reel of the invention is particularly adapted for, but not limited to, use in ice fishing. FIG. 1 shows a light rod having a light springable shaft 1 with a line guide ferrule on its front end 2. The shaft is received in a handle 3 having a grip portion 4. The base 5 of the reel is secured to the forward end of the handle by screws 61.

The base 5 is a U-shaped metal strip having a bottom part 6 with a short upturned front end 71 and a longer upturned rear end 8. The front end 71 has an open spiral loop of wire 9 secured thereto as a line guide into which the line can be easily threaded by slipping the line between the turns 10 of the loop. The back end has a rearwardly projecting line release hand piece 11 secured thereto and is notched at the top as at 12.

Secured to the center of the bottom part 6 is a shaft or pin 13 with a head 14 on its upper end and a peened or riveted connection 15 to the base. Rotatably mounted around the pin 13 is a hub 16 with an upwardly facing shoulder 17 and an external thread 18 above the shoulder. The shoulder supports a first lower disk 19 which in turn supports the web 20 of a spool having a line holding U-shaped rim 21 on its outer edge. A top disk 22 fits on top of the web 20. The threaded portion 18 of the hub removably receives a nut 23 that clamps the web 20 between the disks and against the shoulder 17. A crank having an inner end 24 secured by welding to the side of the nut has an arm 25 projecting radially far enough to extend beyond the rear end part 8 of the base and has an upwardly angled hand or finger piece 26 on its outer end. The notch 12 at the upper edge of the rear end part 8 non-rotatably engages the arm of the crank in the rearwardly rotated position of the nut and hub on the pin 13. A coil of fishing line is conventionally illustrated at 27.

The spool 20 is a commercial article on which lengths of mono-filament or other fishing lines are commonly sold. The threaded portion 18 of the hub is sized to pass through the holes provided in these sales spools so the spool may be mounted directly on the hub and clamped thereto by the nut 23. The fisherman can thus quickly install or change spools to the desired weight or strength of line without rewinding. The sales spool 20 thus functions as both a storage spool and a reel.

The notched rear end 8 acts as a holding brake for the crank and reel and can be released when desired to pay out or wind in the line by depressing the finger piece 11 as shown by the dotted lines at 11A in FIG. 3. The recess or cut-out 7 on the handle permits the base and rear end 8 to flex downwardly when installed on the pole. Holes for passing the screws 61 are formed in the base at 28.

I claim:

1. A reel mount for a fishing pole comprising a base of elongated flexible metal attachable to a pole and having upturned front and rear ends,
    a line guide secured to the upturned front end,
    a release pin secured to and projecting behind said rear end,
    a journal secured to said base and projecting thereabove between said ends,
    a reel having a hub rotatably mounted on said journal and having an upwardly facing shoulder with a threaded portion thereabove,
    a pair of washers removably positioned around said threaded portion and adapted to receive the web of a fish line spool therebetween,
    a nut removably threaded on the upper part of said hub,
    and a crank secured to said nut and extending radially therefrom beyond said rear end,
    said rear end of said base having a notch in its upper edge adapted to receive said crank in one rotated position of the crank and hub.

2. A reel mount for a fishing pole comprising a base of elongated flexible material attachable to a pole and having an upturned rear end,
    a release finger piece secured to and projecting behind said rear end,
    a journal secured to said base and projecting thereabove,
    a reel having a hub rotatably mounted on said journal and having an upwardly facing shoulder with a threaded portion thereabove,
    a pair of washers removably positioned around said threaded portion and adapted to receive the web of a fish line spool therebetween,
    a nut removably threaded on the upper part of said hub,
    and a crank secured to said nut and extending radially therefrom beyond said rear end,
    said rear end of said base having a notch in its upper edge adapted to receive said crank in one rotated position of the crank and hub.

3. A reel mount for a fishing pole comprising a base of elongated flexible material attachable to a pole and having an upturned rear end,
    a release finger piece secured to and projecting behind said rear end,
    a journal secured to said base and projecting thereabove,
    a reel having a hub rotatably mounted on said journal and having an upwardly facing shoulder above said base,
    a reel retaining nut removably threaded on the upper part of said hub,
    and a crank secured to said nut and extending radially therefrom beyond said rear end,
    said rear end of said base having a notch in its upper edge adapted to receive said crank in one rotated position of the crank and hub.

4. A fishing reel comprising a body member formed of a strip of deformable springably resilient stock of substantially uniform width and thickness and having an upturned front end provided with a line guide and an upturned rear end having a notch-like keeper in its upper edge and having a rearwardly projecting finger piece disposed below said notch,
  a journal secured to and projecting upwardly from the bottom portion of said body member between said ends,
  a hub rotatably mounted on said journal and having an upwardly facing shoulder and a threaded portion above said shoulder,
  a bottom washer supported on said shoulder,
  a spool having a central web-like portion supported on said bottom washer and having a peripheral line receiving rim disposed between the said upturned ends of said body member,
  an upper washer disposed on said hub in engagement with the top side of the said web-like portion of the spool,
  a nut on said threaded portion clamping said washers and web against said shoulder,
  and a crank secured to said nut and projecting away therefrom toward and beyond said rear end and engageable with said keeper when it is in its unretracted position, said crank being released for the rotation of the spool for winding or unwinding thereof when the said keeper is disengaged therefrom.

5. A fishing reel comprising a body member having a line guide at its front end and having an upwardly facing manually releasable springable keeper formed in its rear end, and having a rearwardly projecting finger piece disposed below said keeper,
  a journal secured to and projecting upwardly from the bottom portion of said body member,
  a hub rotatably mounted on said journal and having an upwardly facing shoulder and a threaded portion above said shoulder,
  a bottom disc-like support member supported on said shoulder,
  a spool having a central portion supported on said bottom support member and having a peripheral line receiving rim disposed between the said ends of said body member,
  an upper disc-like support member disposed on said hub in engagement with the top side of the said central portion of the spool,
  a nut on said threaded portion of said hub clamping said support and web members together and against said shoulder,
  and a crank secured to said nut and projecting therefrom and engageable with said keeper when it is in its unretracted position said crank being released for the rotation of the spool for winding or unwinding thereof when the said keeper is disengaged therefrom.

6. A fishing reel comprising a body member formed of a strip of conformable springably resilient stock of substantial uniform thickness and having an upturned front portion provided with a line guide and an upturned rear portion having an upwardly facing keeper formed in its upper end and a rearwardly projecting finger piece below said keeper,
  a journal secured to and projecting upwardly from said body member between said line guide and keeper finger piece member,
  a hub rotatably mounted on said journal,
  a spool having a disc-like body portion supportedly mounted on said hub and having a peripheral line receiving portion disposed between said upturned portions of said body member,
  a crank provided with a nut at its inner end having threaded engagement with said hub for clampingly secured said body portion of said spool to said hub, said crank being engageable with said keeper when it is in its unretracted position, said crank when released being manually manipulatable for winding or unwinding rotation of said spool.

References Cited by the Examiner

UNITED STATES PATENTS

| | | | |
|---|---|---|---|
| 522,503 | 7/1894 | De Bem. | |
| 822,113 | 5/1906 | Glocker | 242—84.45 |
| 1,082,637 | 12/1913 | Julien | 242—99 |
| 1,359,519 | 11/1920 | Moore | 242—99 |
| 2,648,506 | 8/1953 | Kirby | 242—84.45 |
| 2,655,756 | 10/1953 | Polis | 242—84.1 X |
| 3,030,046 | 4/1962 | Moghadam | 242—84.1 X |

FOREIGN PATENTS

| | | |
|---|---|---|
| 116,193 | 4/1946 | Sweden. |

MERVIN STEIN, *Primary Examiner.*

B. S. TAYLOR, *Assistant Examiner.*